United States Patent [19]

Sugano et al.

[11] Patent Number: 5,129,285
[45] Date of Patent: Jul. 14, 1992

[54] AUTOMATIC TRANSAXLE

[75] Inventors: Kazuhiko Sugano, Yokohama; Osamu Furuya, Isehara, both of Japan

[73] Assignee: Nissan Motor Co Ltd., Japan

[21] Appl. No.: 577,185

[22] Filed: Aug. 31, 1990

[30] Foreign Application Priority Data

Sep. 1, 1989 [JP] Japan ................................. 1-224634
Sep. 1, 1989 [JP] Japan ................................. 1-224635
Sep. 1, 1989 [JP] Japan ................................. 1-224637

[51] Int. Cl.$^5$ .......................................... F16H 47/00
[52] U.S. Cl. ................... 74/730.1; 475/66; 475/200
[58] Field of Search .............. 74/730.1; 475/66, 200, 475/204

[56] References Cited

U.S. PATENT DOCUMENTS

| | | | |
|---|---|---|---|
| 3,334,703 | 8/1967 | Zeller | 74/730.1 X |
| 3,336,815 | 8/1967 | Leonard | 74/730.1 X |
| 3,360,998 | 1/1968 | Griffel | 74/730.1 X |
| 3,382,735 | 5/1968 | Gatiss | 74/730.1 |
| 3,614,902 | 10/1971 | Candeliero | 475/200 X |
| 3,703,107 | 11/1972 | Piret | 475/66 |
| 4,056,988 | 11/1977 | Kubo et al. | 475/66 |
| 4,364,285 | 12/1982 | Morisawa et al. | 475/66 X |
| 4,467,669 | 8/1984 | Kawamoto | 475/66 |
| 4,793,213 | 12/1988 | Nishimura | 74/730.1 |
| 4,899,622 | 2/1990 | Kobayashi | 475/200 X |

FOREIGN PATENT DOCUMENTS 63-135645 6/1988 Japan ................................. 74/730.1

OTHER PUBLICATIONS

Automatic Transaxle Diagnosis and Unit Repair Section 440-T4.

Primary Examiner—Allan D. Herrmann
Assistant Examiner—Ryan W. Massey

[57] ABSTRACT

An automatic transaxle comprises a rotary motion transmitting unit which transmits a rotary motion between two parallel shafts including an input shaft in driving connection with a turbine of a hydrodynamic unit, i.e., a torque converter. The rotary motion transmitting unit includes a driver sprocket, a follower sprocket, and a chain in driving connection between the sprockets. The pump has a pump housing fixed to a stationary support plate. The driver and follower sprockets are rotatably supported at this stationary support plate. A reaction shaft in driving connection with an inner race of a one-way clutch of a stator of the torque converter extends through the stationary support plate and rotatably supports the driver sprocket. The reaction shaft is hollow to allow the input shaft to extend therethrough. The input shaft is drivingly connected with the driver sprocket. The pump has a pump shaft including a sleeve portion coaxially arranged around and with the reaction shaft and a radial extension fixed to the impeller. Accordingly, the driver is spaced further away from the torque converter in a direction along the input shaft than the pump.

17 Claims, 4 Drawing Sheets

AUTOMATIC TRANSAXLE

BACKGROUND OF THE INVENTION

The present invention relates to an automatic transaxle, and more particularly to an improvement in construction of an automatic transaxle.

A 440-T4 automatic transaxle is shown in FIG. 1 of a publication entitled "Oldsmobile Chassis Service Manual" issued in 1984 by General Motors in the United States of America. As readily understood from a fragmentary view shown in FIG. 4, this known automatic transaxle comprises a torque converter 80 including an impeller 80a, a turbine 80b, and a stator 80c, a rotary motion transmitting unit including a driver chain sprocket 81 coaxially arranged with the impeller 80a, a follower chain sprocket 87, and a chain 88 drivingly interconnecting the driver and follower chain sprockets 81 and 87, a pump 82 in driving connection with the impeller 80a. The impeller 80a is drivingly connected to an engine output shaft, not shown, by a converter cover 80d. The stator 80c is drivingly connected to an outer race of a one-way clutch (an overrunning clutch) 80e whose inner race is drivingly connected to a reaction shaft 91 bolted to a casing 92. This reaction shaft 91, extending through a sleeve 80f of the impeller 80a, rotatably supports the driver sprocket 81 via ball bearing 90. A hollow input shaft 83, coaxially arranged with the impeller 80a, has one end drivingly connected to the turbine 80b. Splined to the input shaft 83 is the driver chain sprocket 81. Thus, a rotary motion is transmitted from the turbine 80b to the driver chain sprocket 81. This rotary motion is transmitted further to the follower chain sprocket 87 by the chain 88. The follower sprocket 87 is splined to a hollow gear box input shaft 86 and rotatably supported via bearing 93 by a follower sprocket support 94 fixed relative to the casing 92. Thus, the rotary motion is transmitted to the gear box input shaft 86. Extending through the gear box input shaft 86 is an output shaft 89. The pump 82 has a pump housing including a pump body 82a and a pump cover 82b. The pump cover and body 82b and 82a are bolted to a control valve assembly 84 which, in turn, is bolted to the casing 92. In order to drive the pump 82, a pump shaft 85 extends through the hollow input shaft 83. The pump shaft 85 has one end splined to the converter cover 80d in driving connection with the impeller 80a and an opposite end splined to the pump 82 at its pump rotor.

In this known automatic transaxle, an axial dimension of an arrangement of component parts around the input shaft can not be compressed since the driver sprocket and the control valve assembly are arranged between the torque converter and the pump. Besides, the input shaft is complicated and cannot be strengthened since the pump shaft extends through the input shaft and a bearing arrangement is to be provided within the input shaft. Since the pump shaft extends through the input shaft which in turn extends through the impeller sleeve, the radial dimension of the impeller sleeve becomes inevitably large, and thus the radial dimension of the torque converter becomes large.

It is also recognized in the known automatic transaxle that the assembly and the subsequent adjustment of the driver and follower chain sprockets require skilled labour and thus are difficult since the follower chain sprocket is rotatably supported by the follower sprocket support which is different from the reaction shaft which rotatably supports the driver sprocket. If there should exist misalignment, occurrence of noise is unavoidable.

As mentioned above, the control valve assembly is arranged between the pump and the driver chain sprocket, so the axial dimension becomes large. This arrangement of the control valve assembly is an obstacle to reduction in the axial dimension.

SUMMARY OF THE INVENTION

A general object of the present invention is to provide an automatic transaxle wherein an axial dimension of an arrangement of component parts around an input shaft is reduced or compressed.

A further object of the present invention is to provide an automatic transaxle wherein an input shaft is simplified and strengthened without any increase in its radial dimension.

A still further object of the present invention is to provide an automatic transaxle with reduced radial dimension, and wherein an input shaft can withstand the same torque stress.

Another object of the present invention is to provide an automatic transaxle wherein a driver and a follower of a rotary motion transmitting unit are assembled without difficult subsequent adjustment.

Still another object of the present invention is to provide an automatic transaxle wherein a control valve assembly is not disposed adjacent a pump.

According to one aspect of the present invention, there are provided in an automatic transaxle:

a hydrodynamic unit including an impeller and a turbine;

a pump in driving connection with said impeller;

a rotary motion transmitting unit including a driver coaxially arranged with said impeller and a follower drivingly associated with said driver;

an input shaft coaxially arranged with said impeller and in driving connection with said turbine and said driver;

means for rotatably supporting said driver of said rotary motion transmitting unit;

said driver being spaced from said hydrodynamic unit in a direction along said input shaft than said pump is.

According to another aspect of the present invention, there are provided in an automatic transaxle:

a hydrodynamic unit including an impeller and a turbine;

a rotary motion transmitting unit including a driver coaxially arranged with said impeller and a follower drivingly associated with said driver;

an input shaft coaxially arranged with said impeller and in driving connection with said turbine and said driver;

means, including a stationary support plate, for rotatably supporting said driver and follower of said rotary motion transmitting unit at said stationary support plate.

According to still another object of the present invention, there are provided in an automatic transmission:

a hydrodynamic unit including an impeller and a turbine;

a pump in driving connection with said impeller;

a rotary motion transmitting unit including a driver coaxially arranged with said impeller and a follower drivingly associated with said driver;

means, including a stationary support plate, for rotatably supporting said driver and follower of said rotary motion transmitting unit at said stationary support plate;

a control valve assembly;

said stationary support plate being formed with passage means for establishing fluid communication between said pump and said control valve assembly.

DETAILED DESCRIPTION OF THE DRAWINGS

Figure 2:
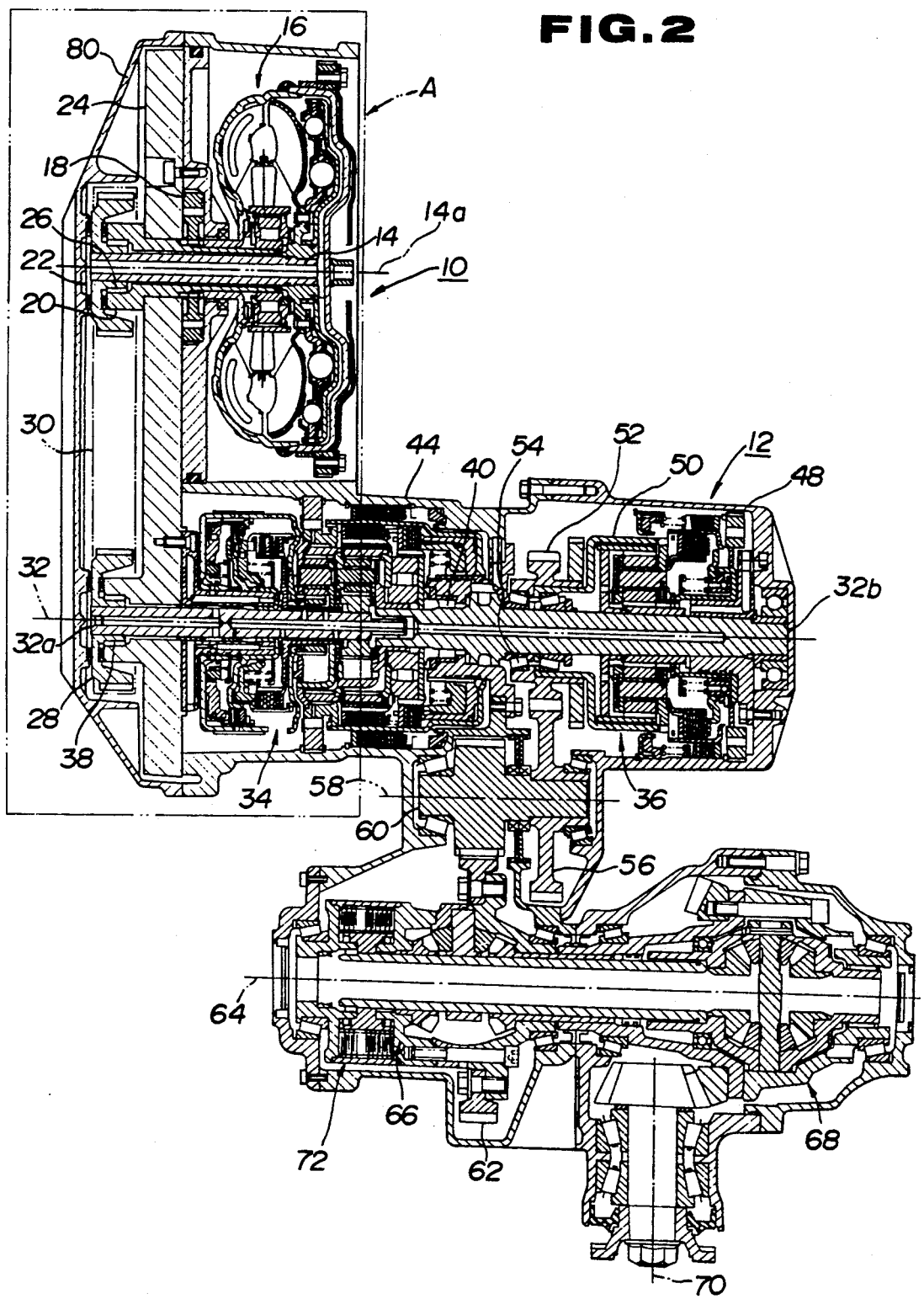
FIG. 2 is a slightly reduced section taken through the line II—II in FIG. 3.

Referring to the accompanying drawings, and more particularly to FIG. 2, there is shown an automatic transaxle 10 including a change-speed gear box 12. The automatic transaxle 10 includes a hydrodynamic unit in the form of a torque converter 16, a pump 18, a reaction shaft 20, and a driver chain sprocket 22.

Figure 1:
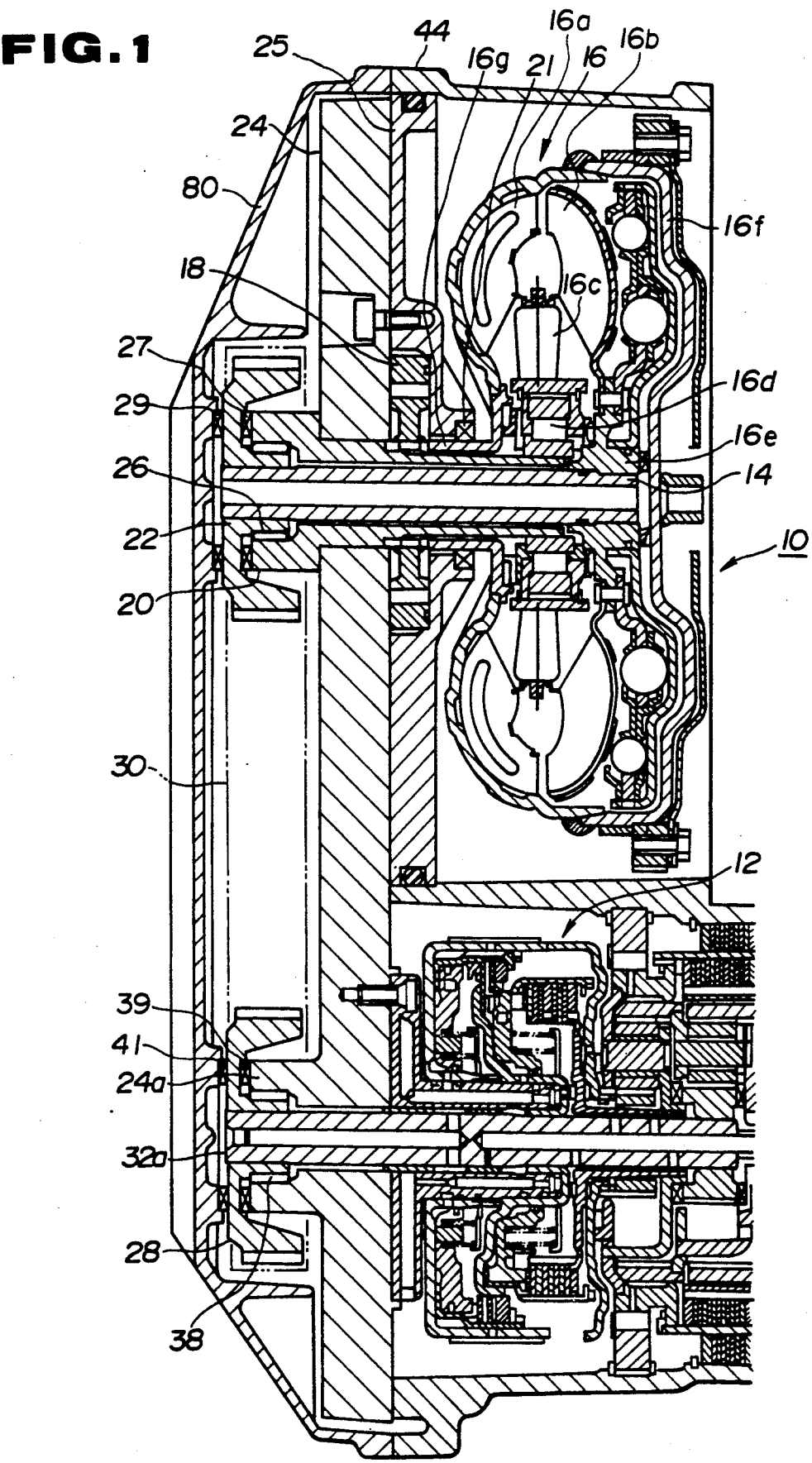
FIG. 1 is an enlarged fragmentary view of a portion enclosed, by a phantom line drawn rectangule A in FIG. 2.

As best seen in FIG. 1, the torque converter includes an impeller 16a, a turbine 16b, and a stator 16c situated between the impeller and turbine 16a and 16b. The stator 16c is drivingly connected to an outer race of a one-way clutch (overrunning) 16d whose inner race is drivingly connected to a reaction shaft 20. The reaction shaft 20 extends through a sprocket support plate 24 which is fixedly secured to a casing 44 (see also FIG. 3). The reaction shaft 20 is fixed to the sprocket support plate 24 and has an enlarged end portion rotatably supporting the driver chain sprocket 22 by bearing 26. Extending through the reaction shaft is an input shaft (a turbine shaft) 14 which is in driving connection with the turbine 16b and the driver chain sprocket 22. Specifically, the input shaft 14 has one end splined to a clutch hub 16e that is secured to the turbine 16b and an opposite end splined to the driver chain sprocket 22. Thus, the driver chain sprocket 22 is coaxially arranged with the impeller 16a since the input shaft 14 is coaxially arranged with the impeller 16a. A rotary motion of the turbine 16b is transmitted to the driver chain sprocket 22 by the input shaft 14. A rotary motion of an engine is transmitted to the impeller 16a by a converter cover 16f. In order to drive the pump 18 by the engine, an impeller sleeve 16g fixedly secured to the impeller 16a is drivingly connected to the pump 18. Thus, this sleeve 16g serves as a pump shaft. Denoted by the reference numeral 21 is a seal situated between the sleeve and a pump housing 25 which is fixedly bolted to the sprocket support plate 24.

Figure 4:
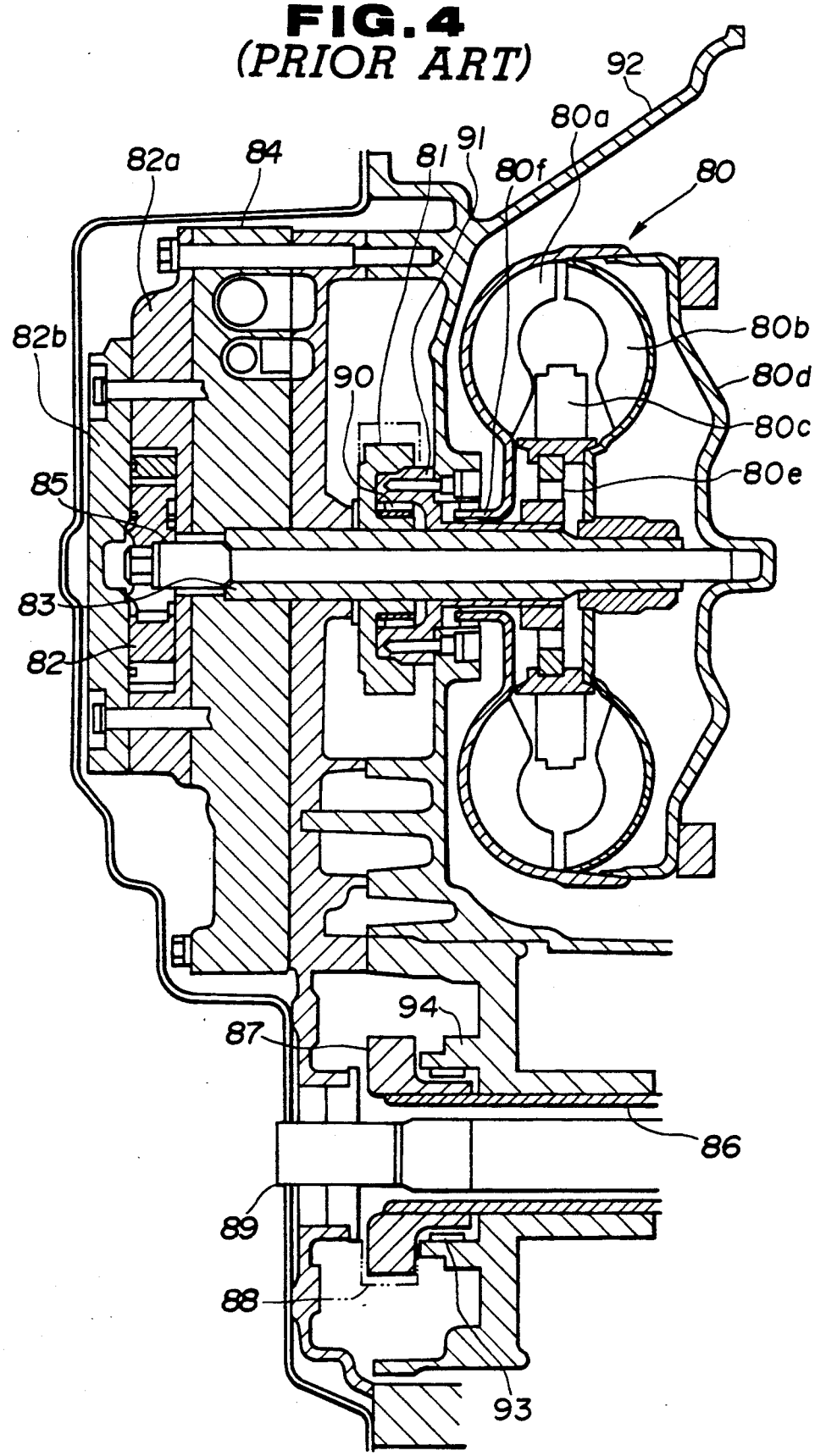
FIG. 4 is a fragmentary sectional view of the known automatic transaxle previously discussed.

As is readily understood from the previous description in connection with FIG. 1, the driver chain sprocket 22 is spaced further away from the torque converter 16 in a direction along the input shaft 14 than the pump 18. The torque converter 16, the pump 18, and the driver chain sprocket 22 are arranged in this order along the input shaft 14. It will be noted that this arrangement is different from the arrangement of the known automatic transaxle discussed in connection with FIG. 4.

Rotary motion of the driver chain sprocket 22 is transmitted to a follower chain sprocket 28 by a chain 30 in driving connection with the driver and follower chain sprockets 22 and 28. Thus, the driver and follower chain sprockets 22 and 28 and the chain 30 cooperate with each other to form a rotary motion transmitting unit.

Figure 3:
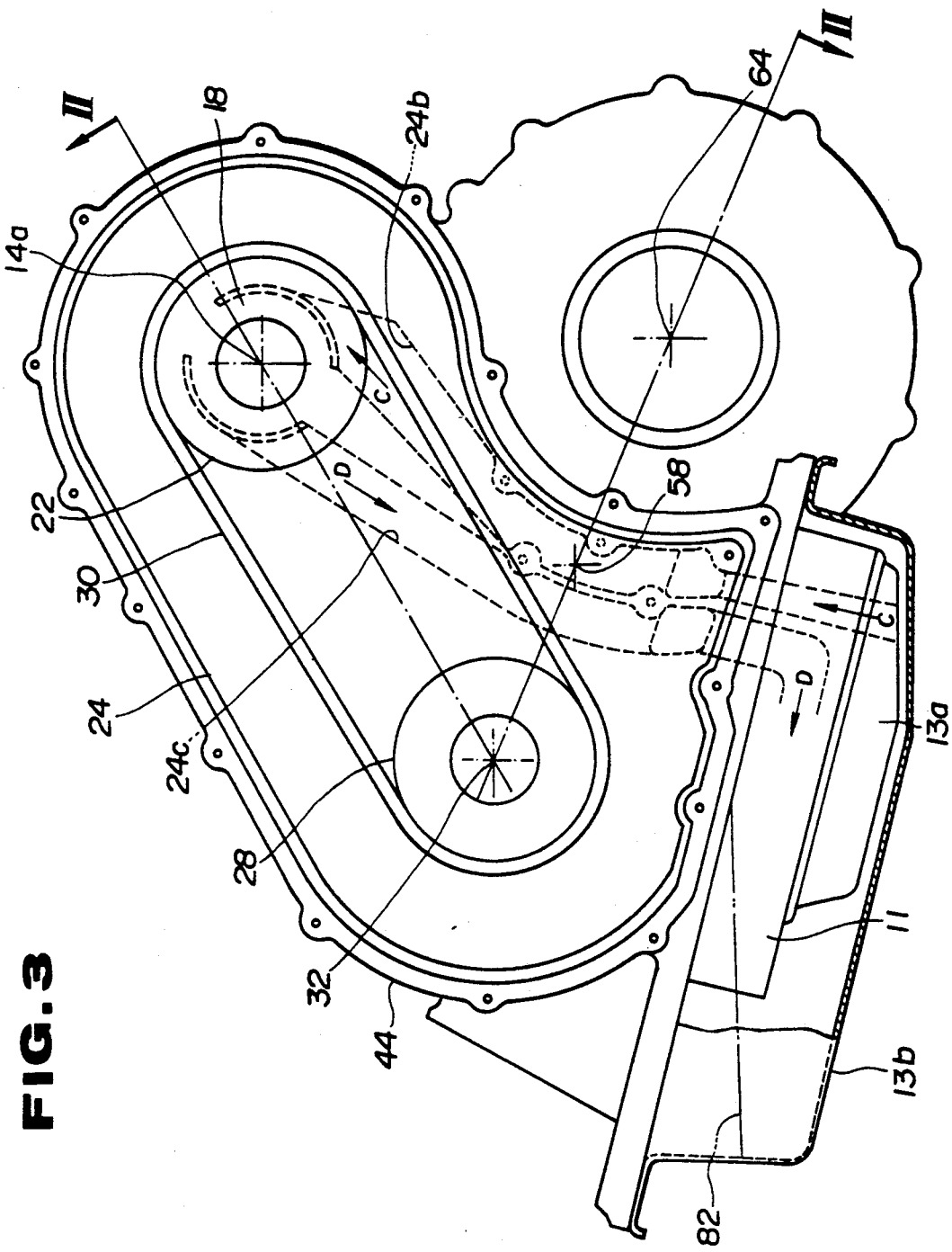
FIG. 3 is an axial end elevation of the automatic transaxle with a chain cover removed to illustrate a rotary motion transmitting unit including a driver and a follower.

As shown in FIGS. 1 and 3, the sprocket support plate 24 extends between the driver and follower chain sprockets 22 and 28, serving as a partition separating the rotary motion transmitting unit from the other component parts of the automatic transaxle 10. The sprocket support plate 24 includes a sprocket support boss 24a rotatably supporting the follower chain sprocket 28 by bearing 38. A gear box input shaft 32a extends through the sprocket support plate 24 at the support boss 24a and splined to the follower chain sprocket 28.

Referring to FIGS. 2 and 3, it is seen that the driver and follower chain sprockets 22 and 28 are rotatable about an axis 14a about which the input shaft 14 is rotatable and an axis 32 about which the gear box input shaft 32a is rotatable.

As shown in FIG. 2, the gear box 12 includes a main gearing 34 arranged around the gear box input shaft 32a, an intermediate shaft 32b coaxial with the gear box input shaft 32a and rotatable about the axis 32, and an auxiliary gearing 36 arranged around the intermediate shaft 32b. The main gearing 34 includes two planetary gear sets and friction units (such as clutches and brakes) and provides four forward speed ratios between the gear box input shaft 32a and the intermediate shaft 32b. The auxiliary gearing 36 includes a single planetary gear set and friction units and provides a direct drive between the intermediate shaft 32b and an output gear 52 and a reduction drive between them. All of the friction units of the main and auxiliary gearings 34 and 36 are hydraulically activated or deactivated by a control valve assembly 11 shown in FIG. 3. The gear box 12 as a whole thus provides five forward speeds and a reverse as will be readily understood from the following Table.

TABLE

| GEAR BOX 12 | 1st. | 2nd. | 3rd. | 4th. | 5th. | Rev. |
|---|---|---|---|---|---|---|
| MAIN GEARING | 1st. | 2nd. | 3rd. | 3rd. | 4th. | Rev. |
| AUXILIARY GEARING | Red. | Red. | Red. | Dir. | Dir. | Red. |

Red. . . . Reduction Drive,
Dir. . . . Direct Drive, and
Rev. . . . Reverse Drive.

The output gear 52 rotatably supported on the intermediate shaft 32b by bearing 54 is splined to a drum 50 of the auxiliary gearing 36 and meshes a counter gear 56 splined to an idler pinion 60 supported for rotation about an idler axis 58. The idler pinion 60 meshes a final gear 62 of a central differential 66. A rotary motion of the final gear 62 of the central differential 66 is transmitted to front left and right axles rotatable about an axis 64 by a front differential 68. Denoted by the reference numeral 72 is a VISCOUS COUPLING (Trade Mark) which has a differential function. It is also transmitted to a rear propeller shaft rotatable about an axis 70. In FIG. 2, denoted by the reference numeral 48 is an auxiliary gearing casing bolted to the casing 44, and denoted by the reference numeral 80 is a chain cover 80 attached to the casing 44 for concealing the chain 30 and the driver and follower chain sprockets 22 and 28.

FIG. 3 is an axial end elevation viewing FIG. 2 from the left with the chain cover 80 removed and an oil pan 13b partly broken away. Referring to FIG. 3, the control valve assembly 11 is disposed at a portion below the axis 32 about which the follower chain sprocket 28 is rotatable together with the gear box input shaft 32a. The control valve assembly 11 is disposed within the oil pan 13b together with an oil strainer 13a attached to the bottom thereof. Thus, the control valve assembly 11 and the oil strainer are immersed in an oil within the oil pan 13b. An oil level is indicated by the reference numeral 82.

In order to supply oil from the oil pan 13b to the pump 18 and to supply oil discharged by the pump 18 to the control valve assembly 11, the sprocket support plate 24 is formed with an oil supply passage 24b and an oil discharge passage 24c. In operation, the oil is supplied to the pump 18 through the passage 24b as shown by arrows C, and oil discharged by the pump 18 is supplied to the control valve assembly 11 through the passage 24c as shown by arrows D. In this manner, the oil pan 13b, pump 18 and control valve assembly 11 are fluidly interconnected by the sprocket support plate 24 formed with the passages 24b and 24c. As a result, it is now possible to arrange the control valve assembly 11 apart from the pump 18 as different from the knwon automatic transaxle. Thus, the axial dimension along the input shaft 14 has been reduced remarkably since it is no more necessary to dispose the control valve assembly adjacent to the pump in the direction of the input shaft.

The assembly of the driver and follower chain sprockets 22 and 28 is as follows: The reaction shaft 20 is inserted through and fixed to the sprocket support plate 24 which is fixedly secured to the casing 44. The bearing 26 is inserted into a bore of the enlarged end portion of the reaction shaft 20, and the bearing 38 into a bore of the sprocket support boss 24a. The driver and follower chain sprockets 22 and 28 are rotatably supported on the sprocket support plate 24 by the bearings 26 and 38, respectively, and splined to the input shaft 14 and the gear box input shaft 32a, respectively. Thrust bearing 27 is disposed between the driver chain sprocket 22 and the enlarged end portion of the reaction shaft 20, while thrust bearing 39 between the follower chain sprocket 28 and the sprocket support boss 24a. Then, the chain 30 is drivingly connected between the driver and follower chain sprockets 22 and 28. Finally, the chain cover 80 is fixedly attached to the casing 44 with thrust bearing 29 disposed between the chain cover 80 and the driver chain sprocket 22 and thrust bearing 41 between the chain cover 80 and the follower chain sprocket 28.

It will now be understood that radial deviation of the driver chain sprocket 22 is restrained by the bearing 26 mounted to the enlarged end portion of the reaction shaft 20, and axial deviation thereof is restrained by the thrust bearings 27 and 29. Likewise, radial deviation of the follower chain sprocket 28 is restrained by the bearing 38 mounted to the follower sprocket boss 24a, and axial deviation thereof is restrained by the thrust bearings 39 and 41. As a result, the chain 30 is positioned appropriately without any difficult subsequent adjustment. Besides, the assembly is relatively easy and occurrence of noise due to deviation of the driver and follower chain sprockets 22 and 28 is avoided.

What is claimed is:

1. In an automatic transaxle having
   a hydrodynamic unit which includes an impeller and a turbine; a pump in driving connection with said impeller; a rotary motion transmitting unit which includes a driver coaxially arranged with said impeller and a follower drivingly engaged with said driver, an input shaft coaxially arranged with said impeller and in driving connection with said turbine and said driver, and means for rotatably supporting said driver and said follower,
   wherein said rotatably supporting means comprises:
   a fixed support plate situated between said pump and said driver and follower, said support plate rotatably engaging and supporting said follower; and
   a reaction shaft fixed to said support plate and extending through said support plate, one end of said reaction shaft rotatably engaging and directly supporting said driver.

2. An automatic transaxle according to claim 1, wherein said support plate is fixed to a casing.

3. An automatic transaxle according to claim 2, wherein said pump comprises a pump housing which is fixed to said support plate.

4. An automatic transaxle according to claim 3, wherein said impeller has an impeller sleeve which is drivingly connected with said pump.

5. An automatic transaxle according to claim 4, wherein said hydrodynamic unit includes a stator situated between said impeller and said turbine, and a one-way clutch which includes an outer race in driving connection with said stator and an inner race.

6. An automatic transaxle according to claim 5, wherein said reaction shaft at the other end is drivingly connected with said inner race of said hydrodynamic unit.

7. An automatic transaxle according to claim 6, wherein said support plate includes a raised boss, said boss engaging and supporting said follower.

8. An automatic transaxle according to claim 7, wherein said reaction shaft is hollow and said input shaft extends through said reaction shaft.

9. An automatic transaxle according to claim 8, wherein said reaction shaft extends through said impeller sleeve.

10. An automatic transaxle according to claim 9, wherein said driver comprises a sprocket and said follower comprises a sprocket, and the driver sprocket and the follower sprocket are drivingly connected through a chain.

11. An automatic transaxle according to claim 3, further comprising a control valve assembly for said pump.

12. An automatic transaxle according to claim 11, wherein said support plate is formed with passage means for establishing fluid communication between said control valve assembly and said pump.

13. An automatic transaxle according to claim 7, wherein said rotatably supporting means further comprises a support cover for rotatably engaging and supporting said driver and follower, said driver and follower being situated between said support cover and support plate.

14. An automatic transaxle according to claim 13, wherein said support cover comprises a pair of raised bosses which rotatably supports said driver and said follower.

15. In an automatic transaxle having a hydrodynamic unit which includes an impeller and a turbine; a rotary motion transmitting unit which includes a driver coaxially arranged with said impeller and a follower drivingly engaged with said driver, an input shaft coaxially arranged with said impeller and in driving connection with said turbine and said driver, and means for rotatably supporting said driver and said follower, wherein said rotatably supporting means comprises:

a support cover having support bosses for rotatably engaging and supporting said driver and follower from one side;

a stationary support plate situated between said hydrodynamic unit and said driver, said support plate having a support boss extending toward said support cover for rotatably engaging and supporting said follower from a side opposite said one side, wherein said driver and said follower is situated between said support cover and said support plate; and a reaction shaft fixed to said support plate and extending through said support plate, said reaction shaft rotatably engaging and directly supporting said driver from said opposite side.

16. In an automatic transaxle having a hydrodynamic unit which includes an impeller and a turbine; a pump in driving connection with said impeller; a rotary motion transmitting unit which includes a driver coaxially arranged with said impeller and a follower drivingly engaged with said driver, an input shaft coaxially arranged with said impeller and in driving connection with said turbine and said driver, and means for rotatably supporting said driver and said follower, wherein said rotatably supporting means comprises:

a fixed support plate extending between said driver and said follower, and situated between said pump and said driver, said support plate rotatably supporting said driver and said follower, a support cover for rotatably supporting and engaging said driver and said follower, said driver and said follower being situated between said support cover and said support plate; and a reaction shaft fixed to said support plate and extending through said support plate, said reaction shaft rotatably engaging and directly supporting said driver.

17. An automatic transaxle according to claim 16, wherein said stationary support plate includes passage means for establishing fluid communication between said pump and a control valve assembly associated with said pump.

* * * * *